United States Patent [19]

Brown

[11] 4,195,538
[45] Apr. 1, 1980

[54] MACHINE TOOL FEED SCREW ASSEMBLY

[75] Inventor: Ivan R. Brown, Horseheads, N.Y.

[73] Assignee: Hardinge Brothers, Inc., Elmirs, N.Y.

[21] Appl. No.: 907,201

[22] Filed: May 18, 1978

[51] Int. Cl.$^2$ .................. B23B 21/00; B23B 3/36; F16B 11/00

[52] U.S. Cl. ............................ 82/27; 82/2 R; 82/34; 285/302; 308/3 A; 403/23; 403/107

[58] Field of Search .............. 82/2 R, 21 R, 22, 23, 82/27, 34; 403/109, 107, 23; 285/302; 308/3 A, 35; 74/467, 428 R, 424.8 R; 408/234.2; 160/222

[56] References Cited

U.S. PATENT DOCUMENTS

| | | | |
|---|---|---|---|
| 1,981,682 | 11/1934 | Volger | 82/27 |
| 2,384,512 | 9/1945 | Wiken et al. | 308/3.5 |
| 2,613,060 | 10/1952 | Trahan | 403/109 |
| 2,930,659 | 3/1960 | Willmore | 308/3.5 |
| 2,982,145 | 5/1961 | Orner | 74/424.8 R |
| 3,304,105 | 2/1967 | Hill | 285/302 |
| 3,667,311 | 6/1972 | Wysong | 74/467 |
| 3,964,801 | 6/1976 | Steinmetz | 308/3 A |
| 3,968,705 | 7/1976 | Amano et al. | 82/27 |
| 4,119,388 | 10/1978 | Armitage | 408/234 |

FOREIGN PATENT DOCUMENTS 543768 3/1942 United Kingdom ............ 82/27

Primary Examiner—Harrison L. Hinson
Attorney, Agent, or Firm—Shlesinger, Arkwright, Garvey & Dinsmore

[57] ABSTRACT

A machine tool feed screw assembly has a lubricant bath disposed in the ball screw support assembly and in retractable enclosures surrounding the feed screw on either side thereof, and flows freely through the ball screw support assembly from one enclosure to the other with movement of the feed screw assembly.

12 Claims, 4 Drawing Figures

MACHINE TOOL FEED SCREW ASSEMBLY

This invention relates to a machine tool and particularly feed assemblies for a precision lathe.

The requirements for accuracy in performance of machine tools have progressively increased over the past twenty-five years. Incremental feed values and feed rates are such that it is essential to provide feed screw assemblies which have a minimum of friction, have no play, and are not susceptible to lack of accuracy or binding due to particles or dust that might interfere with the smooth operation of the feed assembly.

SUMMARY OF INVENTION

Accordingly, it is a principal feature of this invention to provide a feed screw assembly having the capability of providing accurate, trouble-free operation for present types of high-performance machine tools.

A further feature is a protection of the feed screw and bearing assembly.

A still further feature of this invention is the provision of a continuous immersion lubricant bath assembly for the feed screw which also permits accurate response movements of the carriage.

Another feature is the providing of a precision bearing assembly and carriage moving mechanism.

DESCRIPTION OF THE INVENTION

Figure 1:
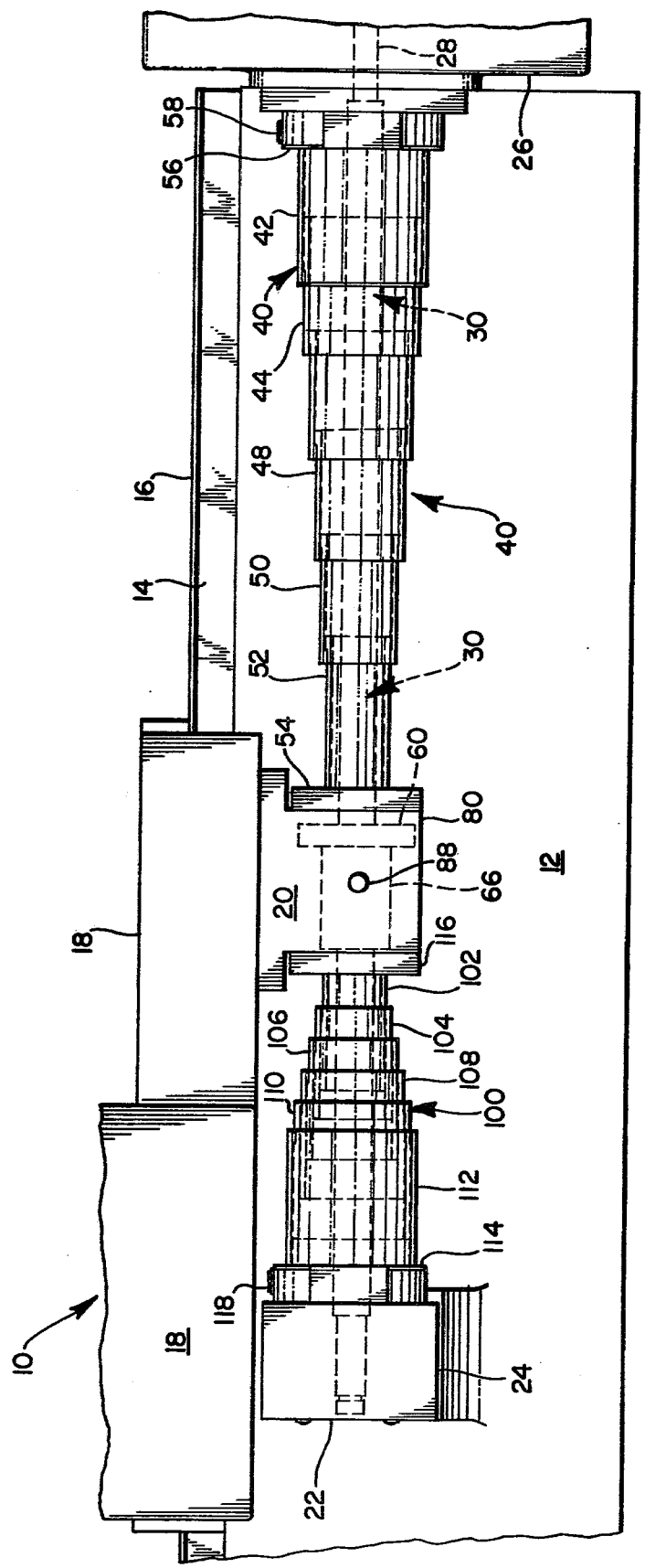
FIG. 1 is a veiw of a high precision lathe showing part of the carriage assembly and the feed screw assembly.
Figure 2:
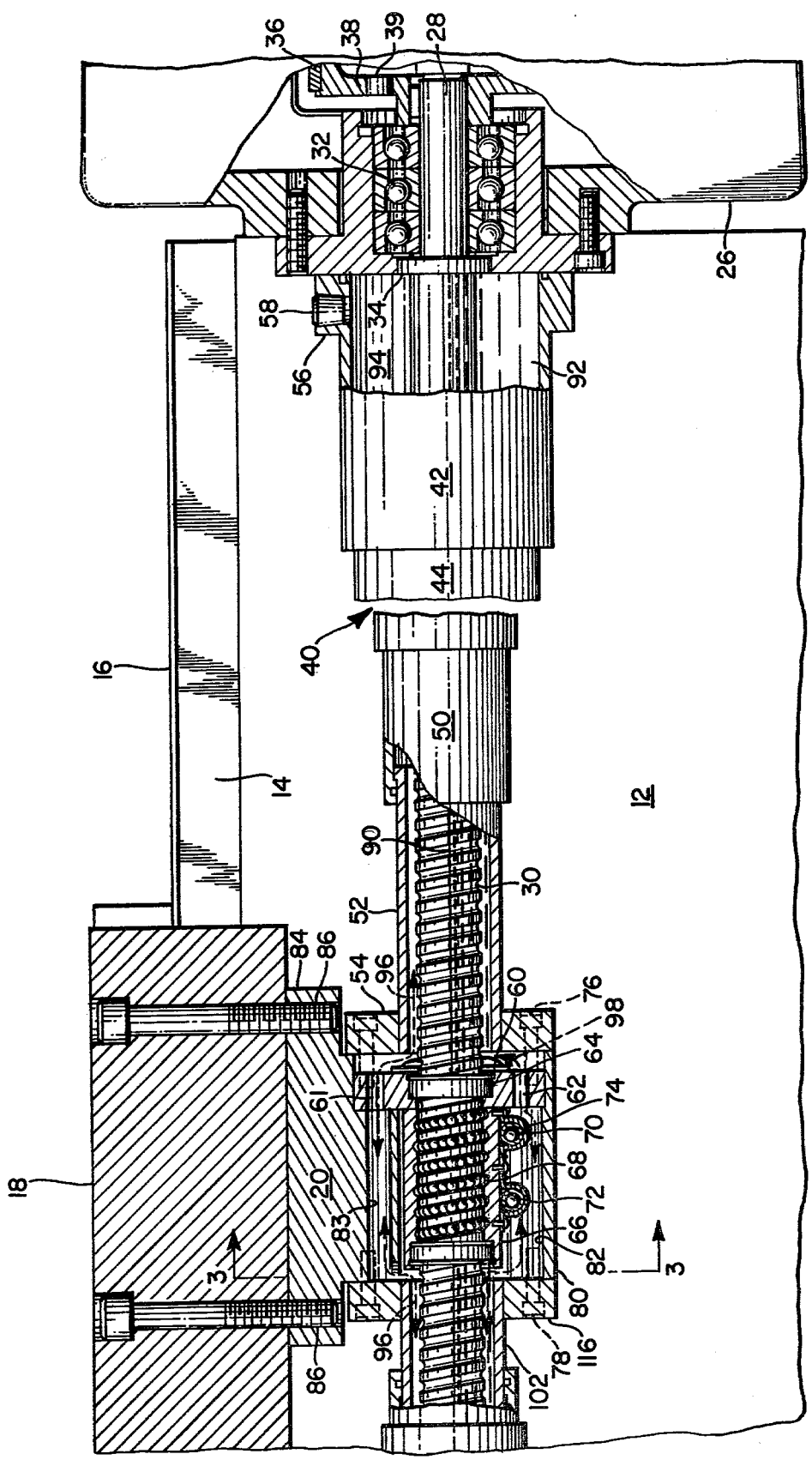
FIG. 2 is a sectional view of the feed screw assembly of FIG. 1.

Referring to the drawings, and particularly to FIGS. 1 and 2, the precision lathe generally indicated at 10 has a bed 12. A slide guide 14 is located along the top surface of the bed and has dovetail type sides and a top surface 16 along which the tool carriage 18 is reciprocated.

The invention is directed to the feed screw assembly disposed beneath the tool carriage 18 for moving it forward and backward. A ball screw supporting block 20 is affixed to the bottom of the carriage 18.

The feed screw is supported on its left by a ball bearing assembly housing generally indicated at 22 and supported by the bracket section 24. The right side of the feed screw is supported by the ball bearing support assembly generally indicated at 26 into which the end 28 of the feed screw 30 is mounted. The ball bearings generally indicated in FIG. 2 at 32 at the right side of the feed screw, support the end of the feed screw shaft 28. A seal 34 is positioned immediately adjacent to the bearings. A feed screw pulley belt 36 is connected to a stepping motor (not shown) and rotates the feed screw pulley 38 which is key connected to the end 28 of the feed screw 30. Magnet 39 is part of a magnetic positioner.

The feed screw 30 is protected by a telescoping protective lubricant bath housing 40 composed of the telescoping elements 42, 44, 46, 48, 50 and 52. A collar 54 is connected to the end of the smaller diameter section 52. The larger end of the telescopic lubricant bath housing has a collar 56 integrally connected to the larger telescoping piece 42. It has removable oil filling plug 58.

The bearing assembly includes a retaining flange 60 disposed within the ball screw supporting block 20. This flange has through passages 61 and 62 through which air and oil respectively pass when the tool carriage traverses along the feed screw. A gasket wiper-type seal 64 is disposed within this flange 60 and lightly engages the surface of the feed screw 30.

A ball screw housing 66 is disposed integral with the retaining flange 60. It contains rows of circulating ball bearings 68 which fit into the convoluted surface of the feed screw 30. The recirculating tube 70 mounted external to the housing 66 has an opening in one end which connects with the end row of ball bearings, and its other end connects with the central-most row of ball bearings. Similarly, one end of recirculating tube 72 is connected to the outermost row of ball bearings and its other end to the centrally disposed row of ball bearings on the left of the cut-away shown in FIG. 2. The recirculating tubes 70 and 72 are held in position by the fastener 74 which extends out and over both of the tubes and is fastened to the ball screw housing 66.

The telescopic housing 40 is held to the block 20 by four mounting screws 76 which extend through the collar 54 and into the block 20. Note that there is a space between the inner surface of the collar 54 and the outer surface of the ball screw retaining flange 60 for air and oil passage from telescopic piece 54 to passage 61 of flange 60.

Figure 3:
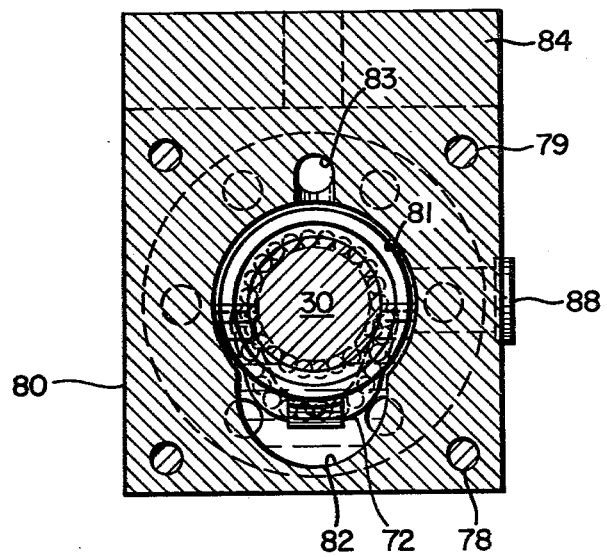
FIG. 3 is a sectional view along lines 2—2 of FIG. 2.

Referring to FIG. 2, and to FIG. 3, six screws, disposed on the circle as shown in FIG. 3, hold the flange 60 to the lower section 80 of the ball screw supporting block 20.

It will be seen, particularly with reference to FIG. 3, that an annular central through-bore 81 is cut through the lower section 80 of the ball screw supporting block 20. A lower bore section 82 also is cut through the block to receive the ball screw housing 66. The lower bore 82 permits clearance for the ball recirculating tubes 70 and 72 as well as providing a lube oil storage and transit section for lube movement through the lower section 80. A through passage 83 is cut through the upper section of the bracket carriage connecting block 20 in line with the opening 61 of flange 60 to provide an air and oil through passage through block 20 above the ball screw housing 66.

The ball screw supporting block 20 has upper outwardly extending sections 84 into which screws 86 from the carriage 18 extend, so that the block 20 is rigidly fastened to the carriage 18. An oil filling plug 88 is disposed in the side of the block 20 as shown in FIG. 3 and generally indicated in FIG. 1.

The lube oil level 90 is shown in FIG. 2. In the right side of the telescopic assembly 40 within the cutaway portion of the largest cylindrical piece 42, the oil bath is filled to half the inside volume shown at 92, leaving a substantial air space above it. Movement of the telescopic housing 40 in fast transverse movements of the tool carriage causes the oil level to rise or fall at a rapid rate. The air space 94 provides a storage area for the lube oil during this movement, and air passes through the upper passages along the arrow indicated at 96 which connects telescopic assembly 40 on one side of the ball screw supporting block 20 with the telescopic assembly 100 on the other side, through the passages 61 and 83.

The dotted arrow path shown at 98 illustrates the path of the lube oil as it passes beneath the lower portion of the feed screw and the ball screw assembly 66, through the plate 62 and through the lower bore 82 of the ball screw support block lower section 80.

The construction of the left telescopic lubricant bath housing 100 is similar to that of the right section, and includes telescopic members 102, 104, 106, 108, 110, 112. A retaining collar 114 mounts the telescopic assembly to the feed screw mounting assembly 22. The telescopic mounting plate 116 attached to the smallest telescopic element 102 is held to the block 80 by screws generally indicated at 78. This plate and the screw arrangement is similar to that of the mounting plate 54 and the screws 76. A plug 118 integral with the collar 114 is of the identical construction as plug 58 shown in FIG. 2.

Figure 4:
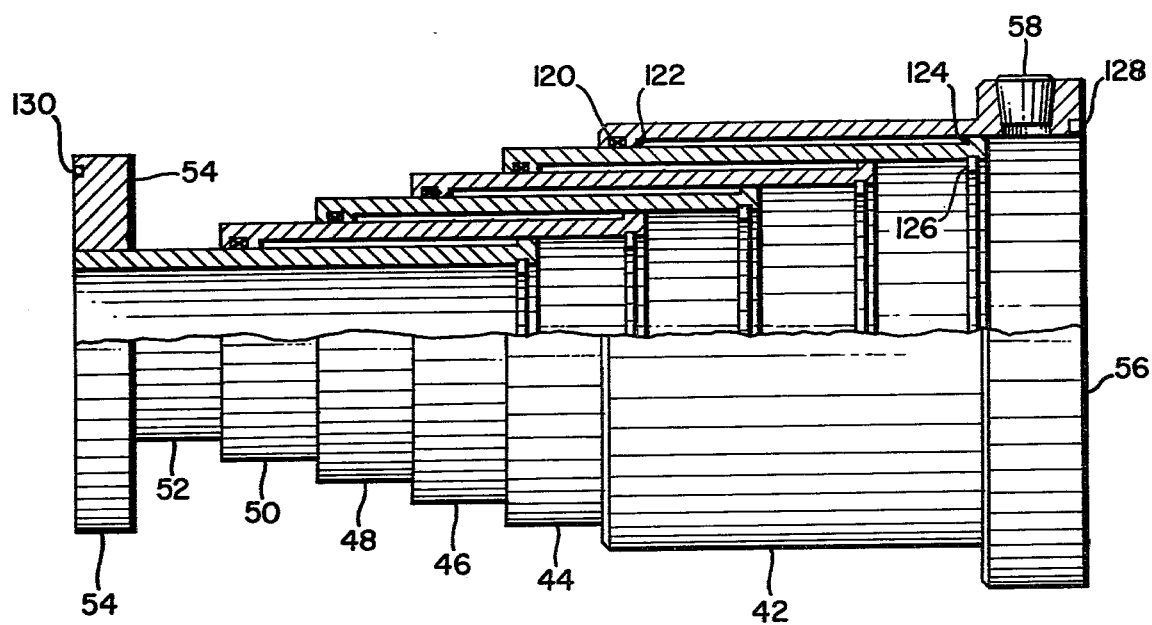
FIG. 4 is a half section of the telescopic lubricant bath unit.

FIG. 4 shows an enlarged detailed construction of the right telescopic lubricant bath housing 40 of FIG. 2. The gasket and sealing arrangements are identical for all elements of the telescopic assembly. Referring to the large telescopic section 42, it has a gasket 120 disposed in a seal recess. This gasket is preferably of the quad design having a general 'X' configuration. The rear section of this gasket assembly has a shoulder 122 which engages the upstanding shoulder 124 of the smaller telescopic element 44 with which it is connected. This stop arrangement precludes disengagement of the elements. The snap ring 126 is disposed in a groove within the telescopic member 44 and acts as a stop for the end of the adjacent telescopic member. The collar 56 has a sealing gasket 128 which abuts the end of the feed screw mounting assembly. Similarly, the collar 54 has a gasket 130 which abuts and seals it against the adjacent surface of the ball screw support block 20.

OPERATION

The feed screw assembly makes it possible to maintain an incremental change accuracy of only several millionths of an inch, while also permitting a rapid transverse along the bed of approximately two hundred inches per minute. The stepping motor assembly rotates the end 28 of the feed screw shaft through the pulley 38 (FIG. 2) which is in turn rotated by the stepping motor belt 36 connected to the stepping motor pulley (not shown).

To ensure trouble free and accurate unimpeded movement, a lubricant bath is used within retractable enclosures which expand and contract depending upon positioning of the carriage 18 of the precision lathe. This arrangement supplies lubricant to the convoluted surface of the feed screw and thus provides a light lubricant for the rows of balls of the recirculating ball screw bearing assembly. It is important that this assembly be protected from both particles of dust or metal to permit the tolerances and accuracy required such that there is no damage or jamming of the ball screw assembly during traverse of the carriage 18.

As the feed screw 30 rotates the convoluted surface will move through the ball screw assembly unit 66 as the rows of recirculating balls 68 progressively advance along the surface of the feed screw 30 as it is rotated. This in turn moves the ball screw supporting block 20 and the integrally connected carriage 18.

As this occurs, and assuming in FIG. 2 that the feed screw is rotated to move the ball screw supports block 20 to the right, the telescopic section 40 will be retracted as the block 20 approaches the housing 26.

As this occurs, the lubricant bath which is enclosed in the telescopic assembly 40 will flow through the ball screw housing support block 20 along the lower section as indicated by the arrow 98 passing through the axial passage 62 and out the other side of the block and into the left telescopic assembly 100 between the feed screw 30 and the cylindrical telescopic member 102.

In cases of rapid traverse, the level of the lube oil will rise within the telescopic assembly 40, particularly in the largest telescopic member 42 in which the large body of fluid will rise into the air space 94. The air will pass through the ball screw assembly from the end of the collar 54 and between its end face and the face of the flange 60, and then through the passage 61 of flange 60, from which it passes through passageway 83 of block 20, as shown by arrow 96. It then flows into the left telescopic assembly 100 which will be expanding.

The ability of the air and of the lube oil to flow freely from the contracting telescoping lube assembly to the expanding lube container assembly is essential. It is also important that sufficient area be left within the assembly for rapid traverses, such that the oil level can rise when the rate of flow through the ball screw assembly support block 20 is unable to accommodate the entire change in volume.

Preferably, the smallest telescopic members are disposed adjacent the bearing assembly so that less oil is initially transferred for movements near the carriage center position.

It should also be noted that the use of the oil bath provides a light film coating on the surfaces of the telescopic members, and in this manner also reduces the possibility of restriction or lag due to resistance of movement.

The construction of the telescopic bath is illustrated in FIG. 4 showing the balance and two-point support construction between the adjacent telescopic members.

The plug 88 is used as an oil filling plug, and is located slightly above the mid-level point in the bearing assembly so that the oil level can be accurately gauged.

While this invention has been described, it will be understood that it is capable of further modification, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What I claim is:

1. A protection assembly for machine tool feed screws, comprising:
    (a) a machine tool having a slide guide supported on a bed
    (b) a movable carriage and cross slide reciprocally mounted on the slide guide
    (c) an elongated feed screw supported on the bed and disposed parallel to the slide guide
    (d) the carriage being connected to the feed screw such that it is moved along its length
    (e) including an expandable cover section of a plurality of interlocked telescopic pieces disposed around the feed screw and connected to the carriage for providing a continuous sealed cover for the feed screw at all positions of the carriage, and (f) the cover means is spaced from the feed screw member and contains a body of lubricant which is in continuous contact with the feed screw.

2. The protection assembly for machine tool feed screws as set forth in claim 1, wherein:
   (a) the expandable cover means includes an expandable cover section disposed on either side of the carriage member such that when one section expands, the other section contracts as the carriage is moved along the elongated feed screw.
   (b) conduits means is provided between each of the expandable sections for allowing lubricant to freely flow from one section to the other as the carriage moves along the feed screw.

3. The protection assembly for machine tool feed screws as set forth in claim 2, wherein:
   (a) each section of the expandable cover means includes a plurality of stepped interfitted elements reciprocally mounted with respect to each other.

4. A machine tool feed screw assembly, comprising:
   (a) a tool carriage reciprocal on the guideway bed plate
   (b) a rotatable feed screw disposed parallel to the guideway
   (c) a bearing assembly connected to the feed screw for providing transverse incremental movement therealong and which is integral with the tool carriage, and
   (d) a lubricant bath assembly having two independent sections and surrounding the feed screw along its entire length and which is adjustable in length to accomodate changes in position of the bearing assembly along the length of the feed screw,
   (e) means for providing passage of fluid from one of the two sections to another.

5. The machine tool feed screw assembly as set forth in claim 4, wherein:
   (a) the lubricant bath assembly includes collapsible sleeve assemblies on either side of the bearing assembly, and
   (b) fluid passages interconnect the collapsible sleeve assemblies to provide for flow of lubricant from one sleeve assembly to the other.

6. The machine tool feed screw assembly as set forth in claim 5, wherein:
   (a) the bearing assembly has plural passages therethrough for respectively providing for flow of oil and air from one collapsible sleeve assembly to the other.

7. A machine tool feed screw assembly as set forth in claim 6, wherein:
   (a) the collapsible sleeve assemblies include at lease four telescopic elements, and
   (b) the smaller size telescopic elements are connected to the bearing assembly.

8. The machine tool feed screw assembly as set forth in claim 4, wherein:
   (a) the bearing assembly includes a recirculating type ball screw unit, and
   (b) the ball screw bearing unit is disposed within a ball screw support block which is integrally connected to the tool carriage.

9. The machine tool feed screw assembly as set forth in claim 8, wherein:
   (a) the lubricant bath assembly includes a telescopic assembly integrally connected on each side of the ball screw support block.

10. The machine tool feed screw assembly as set forth in claim 4, wherein:
    (a) a stepping motor assembly is directly connected to the feed screw to control rotation thereof.

11. The machine tool feed screw assembly as set forth in claim 10, wherein:
    (a) the stepping motor assembly includes an element of a magnetic positioner.

12. A protection assembly for machine tool feed screws, comprising:
    (a) a machine tool having a slide guide supported on a bed
    (b) a movable carriage and cross slide reciprocally mounted on the slide guide
    (c) an elongated feed screw supported on the bed and disposed parallel to the slide guide
    (d) the carriage being connected to the feed screw such that it is moved along its length
    (e) expandable cover means includes an expanding cover section disposed on either side of the carriage member such that when one section expands, the other section contracts as the carriage is moved along the elongated feed screw,
    (f) a body of lubricant is disposed between each section and its corresponding portion of the feed screw, and
    (g) conduit means is provided means is provided between each of the expandable sections for allowing lubricant to freely flow from one section to the other as the carriage moves along the feed screw.

* * * * *